US010255200B2

(12) United States Patent
Vichodes et al.

(10) Patent No.: US 10,255,200 B2
(45) Date of Patent: Apr. 9, 2019

(54) DATA STORAGE DEVICE AND METHOD OF OPERATION USING MULTIPLE SECURITY PROTOCOLS

(71) Applicant: Western Digital Technologies, Inc., San Jose, CA (US)

(72) Inventors: Lev Vichodes, Beer-Sheva (IL); Artsiom Zankovich, San Jose, CA (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 88 days.

(21) Appl. No.: 14/924,545

(22) Filed: Oct. 27, 2015

(65) Prior Publication Data
US 2016/0246737 A1 Aug. 25, 2016

Related U.S. Application Data

(60) Provisional application No. 62/120,530, filed on Feb. 25, 2015.

(51) Int. Cl.
G06F 21/44 (2013.01)
G06F 21/31 (2013.01)
G06F 12/14 (2006.01)
H04L 9/08 (2006.01)
H04L 9/32 (2006.01)

(52) U.S. Cl.
CPC ........ G06F 12/1408 (2013.01); H04L 9/0822 (2013.01); H04L 9/0877 (2013.01); H04L 9/3226 (2013.01); G06F 2212/1052 (2013.01)

(58) Field of Classification Search
CPC ..... G06F 2212/402; G06F 21/31; G06F 21/44
See application file for complete search history.

(56) References Cited

U.S. PATENT DOCUMENTS 8,166,067 B2 4/2012 Hahn
2010/0191962 A1 7/2010 Yan et al.
2014/0040639 A1* 2/2014 Raam .................... G06F 21/606
713/193

(Continued)

OTHER PUBLICATIONS

Trusted Computing Group, TCG and NVMe Joint White Paper, 2007-2015, pp. 1-11.*

(Continued)

Primary Examiner — Izunna Okeke
(74) Attorney, Agent, or Firm — Patterson & Sheridan, LLP; Steven Versteeg

(57) ABSTRACT

A data storage device includes a memory and a controller that is coupled to the memory. The controller includes an authentication engine, an interface, and an encryption engine. The authentication engine is configured to authenticate an accessing device based on a message received from the accessing device. The interface is configured to receive data from the accessing device. The message is associated with a first security protocol that does not specify that the data is to be encrypted. The encryption engine is configured to encrypt the data in accordance with a second security protocol, and the controller is configured to receive, after encrypting the data, a request from the accessing device to operate according to the second security protocol.

24 Claims, 8 Drawing Sheets

(56) References Cited

U.S. PATENT DOCUMENTS

| | | | |
|---|---|---|---|
| 2015/0229471 A1* | 8/2015 | Nair | H04L 9/0822 713/171 |
| 2015/0242657 A1* | 8/2015 | Kim | G06F 21/78 713/193 |
| 2015/0371052 A1* | 12/2015 | Lepeshenkov | H04L 63/06 713/165 |

OTHER PUBLICATIONS

"TCG Storage, Opal, and NVMe", Trusted Computing Group and NVM Express Joint White Paper, Aug. 2015, pp. 1-11.

* cited by examiner

DATA STORAGE DEVICE AND METHOD OF
OPERATION USING MULTIPLE SECURITY
PROTOCOLS

CROSS-REFERENCE TO RELATED APPLICATIONS

The present application claims benefit of U.S. Provisional Application No. 62/120,530, filed Feb. 25, 2015, which is incorporated by reference herein in its entirety.

FIELD OF THE DISCLOSURE

This disclosure is generally related to data storage devices and more particularly to security protocols for data storage devices.

BACKGROUND

Non-volatile data storage devices have enabled increased portability of data and other information, such as software applications. During operation of a storage device, data may be programmed to the storage device, read from the storage device, and erased from the storage device. For example, an accessing device (e.g., a host device) may write data to the storage device, read data from the storage device, and erase data from the storage device.

A storage device may use a security protocol to secure data written to the storage device. For example, the storage device may operate in accordance with a security protocol that specifies that a host device is to be authenticated using an authentication process prior to granting the host device access to the data.

In some cases, the authentication process may inhibit or restrict the storage device from performing certain operations, or the authentication process may otherwise reduce performance of the storage device. For example, in some cases, use of a security protocol may result in loss of data, such as if the host device cannot be successfully authenticated, or if another security protocol is to be implemented that is incompatible with the authentication process.

SUMMARY

A controller of a data storage device may operate in accordance with multiple security protocols. For example, the controller may operate using a first security protocol that does not specify that data stored at a memory of the data storage device is to be encrypted (or that specifies that the data is to be unencrypted). The first security protocol may be a password-based or an authentication-based security protocol. For example, the first security protocol may specify that an accessing device (e.g., a host device) is to be authenticated using a password-based authentication process prior to granting memory access to the accessing device.

During operation according to the first security protocol, the controller may encrypt the data in accordance with a second security protocol (e.g., an encryption-based security protocol). The second security protocol may be an encryption-based security protocol that specifies that data is to be encrypted. The first security protocol and the second security protocol may be Trusted Computing Group™ (TCG) (service mark of Trusted Computing Group non-profit corporation of Beaverton, Oreg.) security protocols, such as a TCG Pyrite security protocol and a TCG Opal security protocol, respectively, as illustrative examples. During operation according to the first security protocol, data encryption may be transparent (or "invisible") to the accessing device. For example, the data storage device may not report use of encryption to the accessing device, and encryption operations and decryption operations may be performed internally to the data storage device.

Encrypting the data while operating based on the first security protocol may enable the data storage device to transition from the first security protocol to the second security protocol without reformatting the memory. To illustrate, if data is unencrypted when a request to operate using the second security protocol is received from the accessing device, a device may need to perform a memory reformatting process to enable compliance with the second security protocol, which may result in data loss. By encrypting data in accordance with the second security protocol before the request is received, memory reformatting (and data loss) can be avoided.

DETAILED DESCRIPTION

Particular aspects of the disclosure are described below with reference to the drawings. In the description, common or similar features may be designated by common reference numbers. As used herein, "exemplary" may indicate an example, an implementation, and/or an aspect, and should not be construed as limiting or as indicating a preference or a preferred implementation.

Figure 1A:
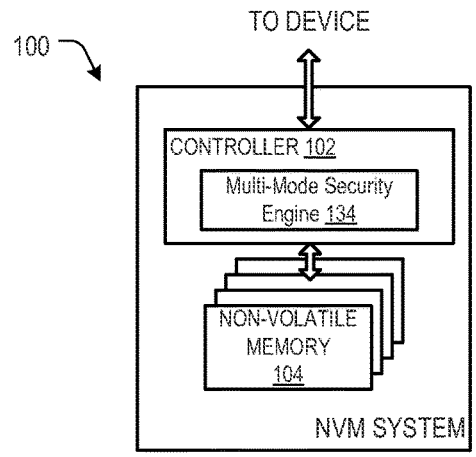
FIG. 1A is a block diagram of an illustrative example of a non-volatile memory system including a controller that includes a multi-mode security engine.
Figure 1B:
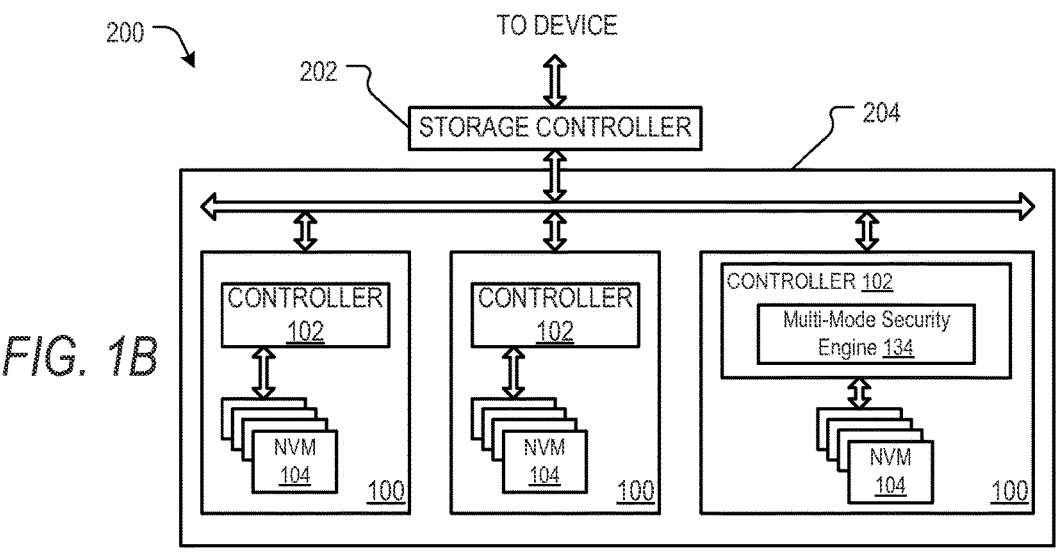
FIG. 1B is a block diagram of an illustrative example of a storage module that includes plural non-volatile memory systems that each may include a controller having a multi-mode security engine.
Figure 1C:
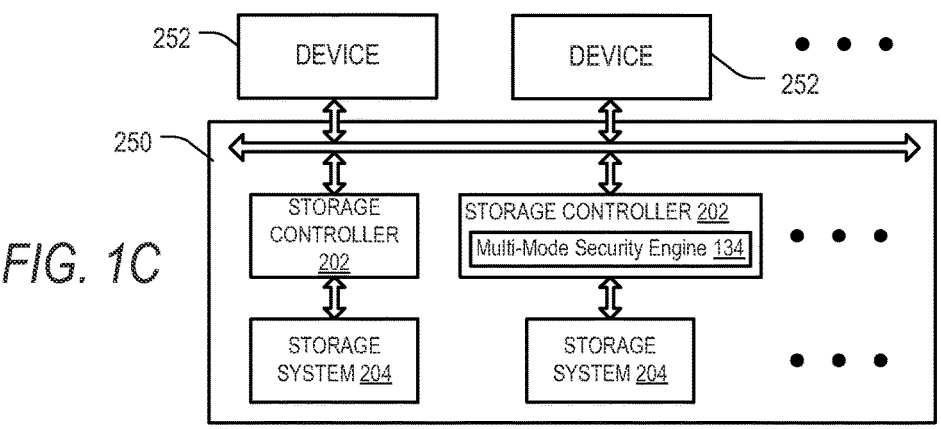
FIG. 1C is a block diagram of an illustrative example of a hierarchical storage system that includes a plurality of storage controllers that each may include a multi-mode security engine.

Memory systems suitable for use in implementing aspects of these embodiments are shown in FIGS. 1A-1C. FIG. 1A is a block diagram illustrating a non-volatile memory system according to an embodiment of the subject matter described herein. Referring to FIG. 1A, a non-volatile memory system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a device (e.g., a host device or an access device) and transmits command sequences for read, program, and erase operations to non-volatile memory die 104. The controller 102 may include a multi-mode security engine 134 configured to operate using multiple security protocols. An illustrative implementation of the multi-mode security engine 134 is described further with reference to FIG. 3.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a device (e.g., a host device or an access device), such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a device needs to read data from or write data to the flash memory, it will communicate with the flash memory controller. If the device provides a logical address to which data is to be read/written, the flash memory controller can convert the logical address received from the device to a physical address in the flash memory. (Alternatively, the device can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, non-volatile memory system 100 may be a card based system. In an alternate embodiment, memory system 100 may be part of an embedded memory system.

Although, in the example illustrated in FIG. 1A, non-volatile memory system 100 (sometimes referred to herein as a storage module) includes a single channel between controller 102 and non-volatile memory die 104, the subject matter described herein is not limited to having a single memory channel. For example, in some NAND memory system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a device and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers. Each controller 102 of FIG. 1B may include a multi-mode security engine corresponding to the multi-mode security engine 134. Alternatively or in addition, the storage controller 202 may include a multi-mode security engine corresponding to the multi-mode security engine 134.

FIG. 1C is a block diagram illustrating a hierarchical storage system. A hierarchical storage system 250 includes a plurality of storage controllers 202, each of which controls a respective storage system 204. Device 252 may access memories within the hierarchical storage system 250 via a bus interface. In one embodiment, the bus interface may be an NVMe or fiber channel over Ethernet (FCoE) interface. In one embodiment, the hierarchical storage system 250 illustrated in FIG. 1C may be a rack mountable mass storage system that is accessible by multiple devices, such as would be found in a data center or other location where mass storage is needed. Each storage controller 202 of FIG. 1B may include a multi-mode security engine corresponding to the multi-mode security engine 134.

Figure 2A:
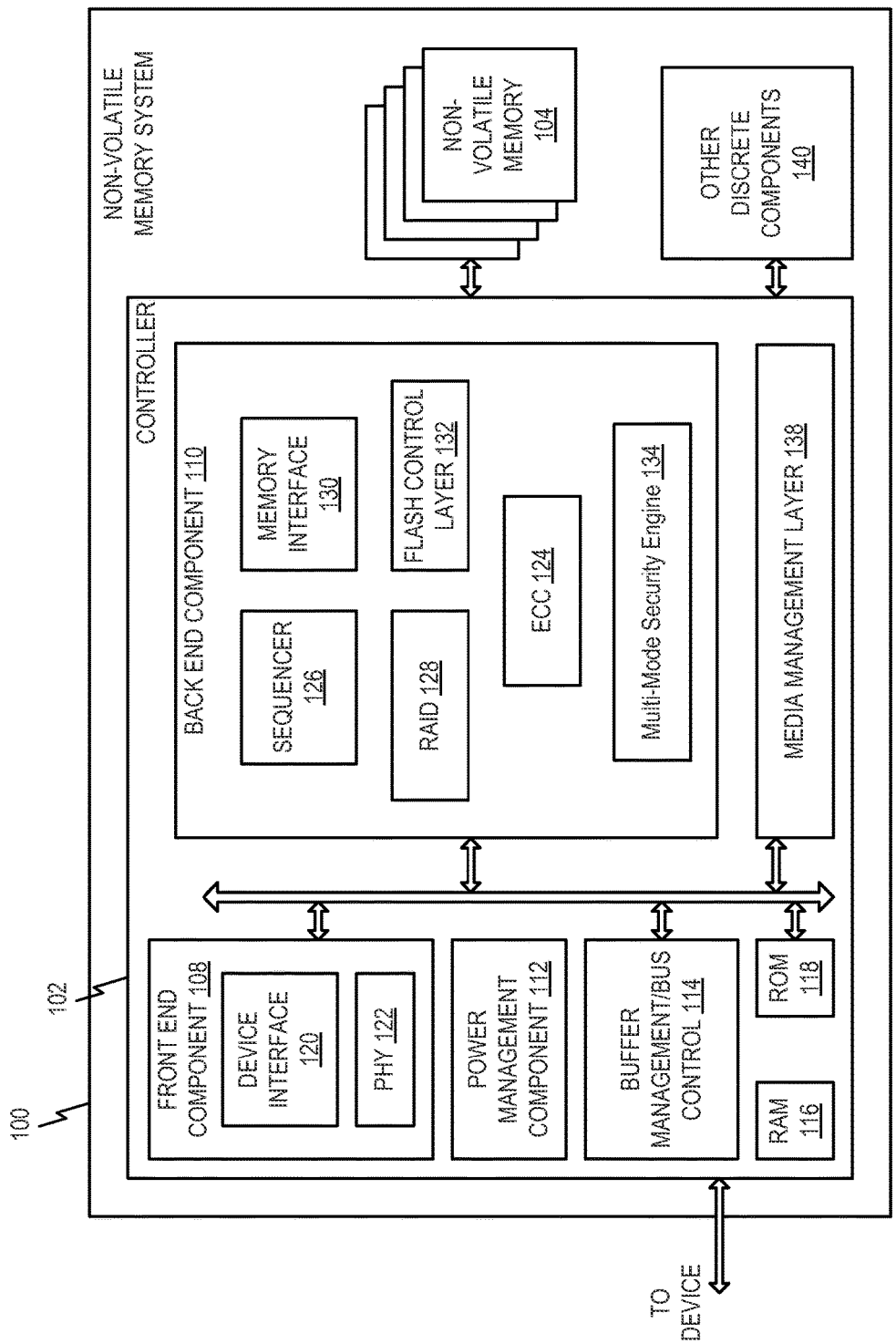
FIG. 2A is a block diagram illustrating exemplary components of an illustrative example of a controller that includes a multi-mode security engine.

FIG. 2A is a block diagram illustrating exemplary components of controller 102 in more detail. Controller 102 includes a front end component 108 that interfaces with a device, a back end component 110 that interfaces with the one or more non-volatile memory die 104, and various other modules that perform other functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located within the controller 102, in other embodiments one or both of the RAM 116 and ROM 118 may be located externally to the controller 102. In yet other embodiments, portions of RAM and ROM may be located both within the controller 102 and outside the controller.

Front end component 108 includes a device interface 120 and a physical layer interface (PHY) 122 that provide the electrical interface with the host or next level storage controller. The choice of the type of device interface 120 can depend on the type of memory being used. Examples of device interfaces 120 include, but are not limited to, SATA, SATA Express, SAS, Fibre Channel, USB, PCIe, and NVMe. The device interface 120 typically facilitates transfer for data, control signals, and timing signals.

Back end component 110 includes an error correction controller (ECC) engine 124 that encodes the data bytes received from a device, and decodes and error corrects the data bytes read from the non-volatile memory. A command sequencer 126 generates command sequences, such as program and erase command sequences, to be transmitted to non-volatile memory die 104. A redundant array of independent drives (RAID) component 128 manages generation of RAID parity and recovery of failed data. The RAID parity may be used as an additional level of integrity protection for the data being written into the non-volatile memory die 104. In some cases, the RAID component 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end component 110. The back end component 110 may also include the multi-mode security engine 134.

Additional components of system 100 illustrated in FIG. 2A include a power management component 112 and a media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID component 128, media management layer 138 and buffer management/bus controller 114 are optional components that are not necessary in the controller 102.

Figure 2B:
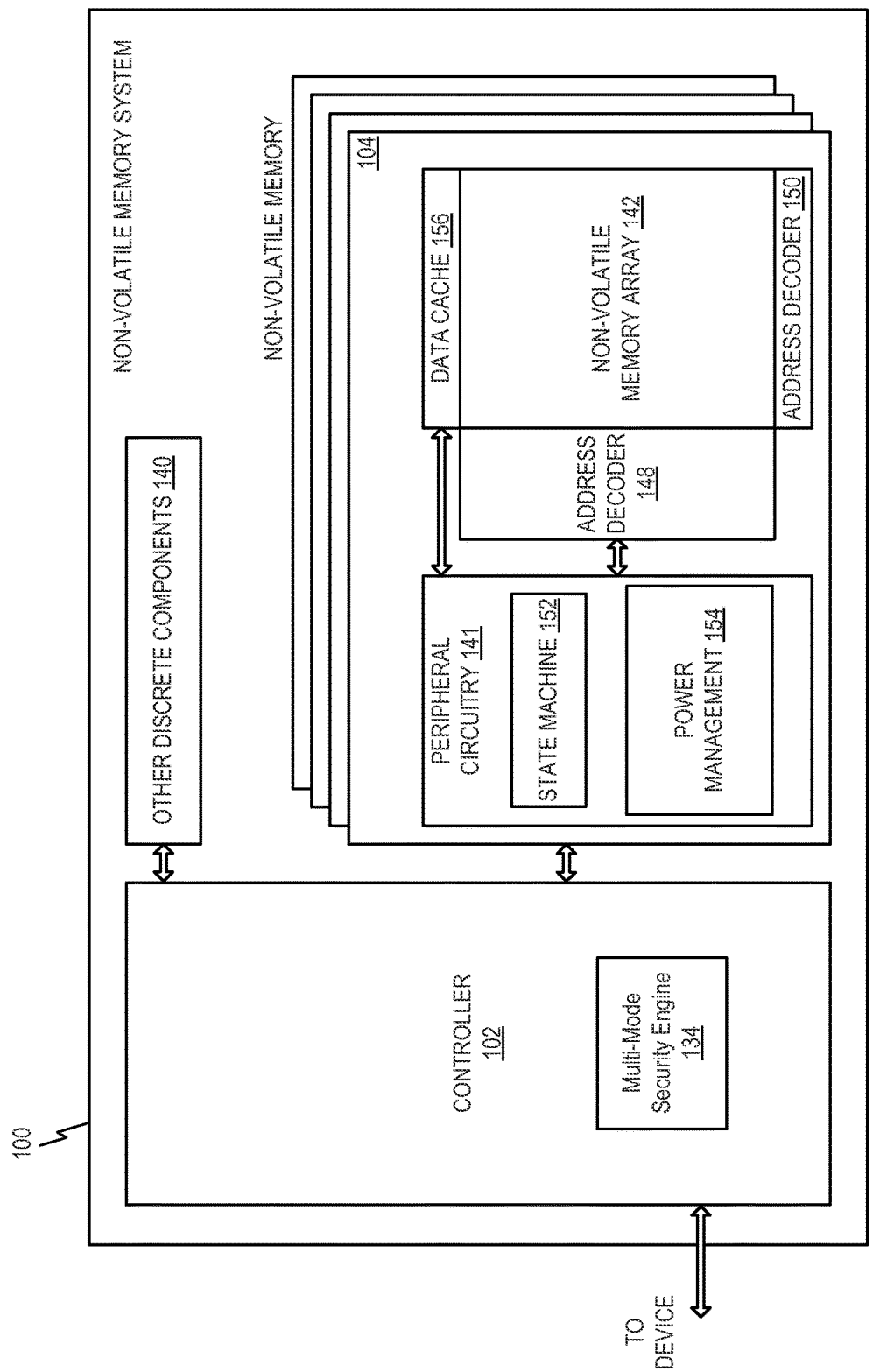
FIG. 2B is a block diagram illustrating exemplary components of a non-volatile memory die that may be coupled to a controller that includes a multi-mode security engine.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102, which may include the multi-mode security engine 134. In one embodiment, the peripheral circuitry 141 also includes a power management or data latch control module 154. Non-volatile memory die 104 further includes discrete components 140, an address decoder 148, an address decoder 150, and a data cache 156 that caches data.

Figure 3:
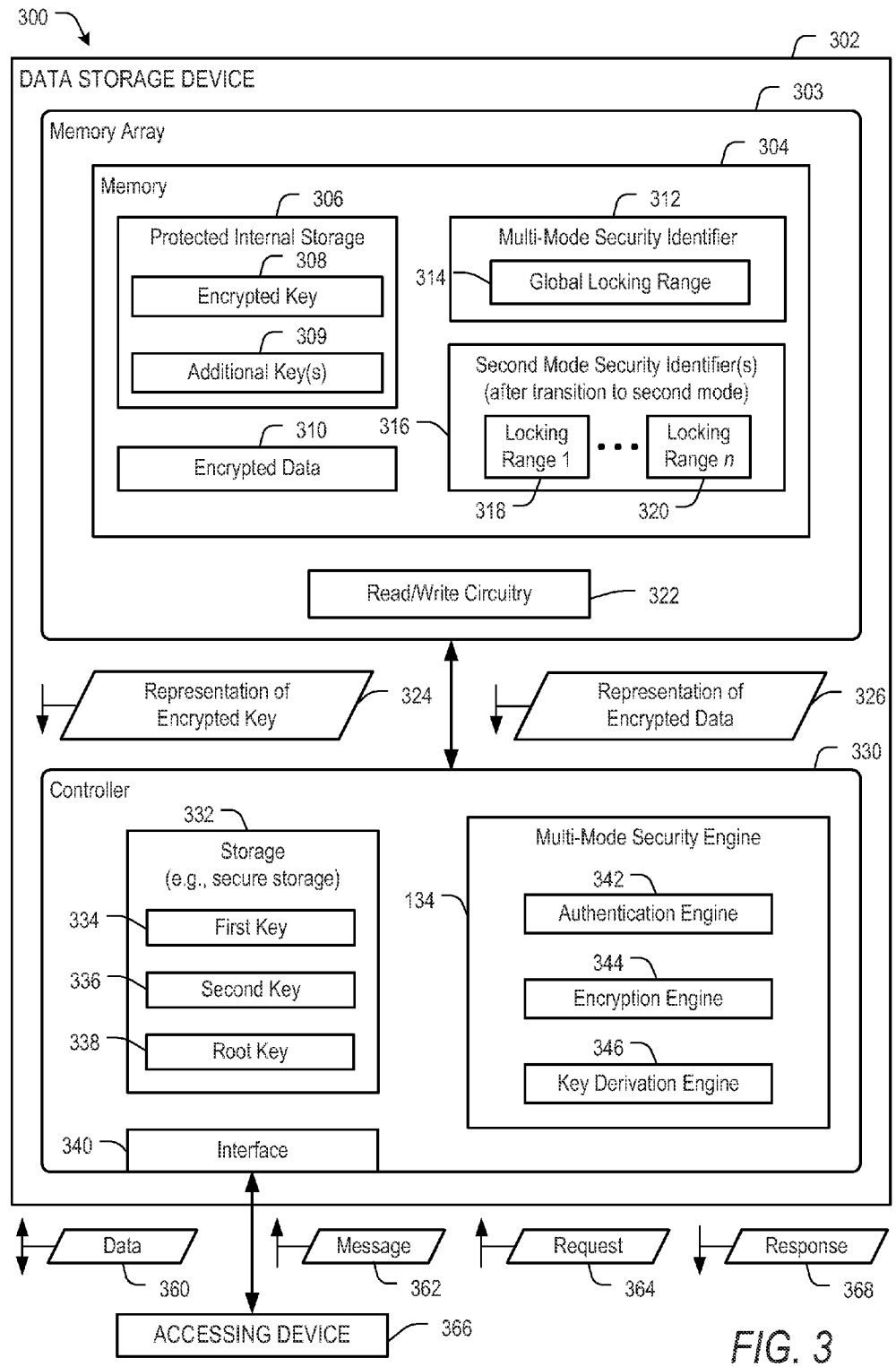
FIG. 3 is a block diagram of an illustrative example of a system that includes a data storage device having a controller that includes a multi-mode security engine.

Referring to FIG. 3, an illustrative example of a system is depicted and generally designated 300. The system 300 includes a data storage device 302 (e.g., the non-volatile memory system 100) and an accessing device 366 (e.g., a host device, such as the device 252). The data storage device 302 and the accessing device 366 may be operationally coupled via a connection, such as a bus, a wireless connection, or a network connection.

The data storage device 302 may be embedded within the accessing device 366, such as in accordance with a non-volatile memory express (NVMe) configuration or a peripheral component interface express (PCIe) configuration, as illustrative examples. For example, the accessing device 366 may include a host device, and the data storage device 302 may be integrated within the host device. Alternatively, the data storage device 302 may be removable from the accessing device 366 (i.e., "removably" coupled to the accessing device 366). As an example, the data storage device 302 may be removably coupled to the accessing device 366 in accordance with a removable universal serial bus (USB) configuration.

In some implementations, the data storage device 302 may include a solid state drive (SSD), which may function as an embedded storage drive (e.g., a mobile embedded storage drive), an enterprise storage drive (ESD), a client storage device, or a cloud storage drive, as illustrative, non-limiting examples. In some implementations, the data storage device 302 may be coupled to the accessing device 366 via a communication network. For example, the data storage device 302 may be a network-attached storage (NAS) device or a component (e.g., an SSD component) of a data center storage system, an enterprise storage system, or a storage area network, as illustrative examples.

The data storage device 302 may include a memory array 303 (e.g., one or more memory dies, such as the non-volatile memory die 104) and a controller 330 (e.g., the controller 102 or the storage controller 202). The memory array 303 and the controller 330 may be coupled via one or more buses, one or more interfaces, one or more other structures, or a combination thereof. An interface may be wired (e.g., a bus structure) or wireless (e.g., a wireless communication interface). It should be appreciated that the data storage device 302 may include any number of memory dies (e.g., one memory die, two memory dies, eight memory dies, or another number of memory dies).

The memory array 303 includes a memory 304 (e.g., the non-volatile memory array 142). The memory 304 may include a non-volatile memory. For example, the memory 304 may include a flash memory, such as a NAND flash memory, or a resistive memory, such as a resistive random access memory (ReRAM), as illustrative examples. The memory 304 may have a three-dimensional (3D) memory configuration. As an example, the memory 304 may have a 3D vertical bit line (VBL) configuration. In a particular implementation, the memory 304 is a non-volatile memory having a 3D memory configuration that is monolithically formed in one or more physical levels of arrays of memory cells having an active area disposed above a silicon substrate. Alternatively, the memory 304 may have another configuration, such as a two-dimensional (2D) memory configuration or a non-monolithic 3D memory configuration (e.g., a stacked die 3D memory configuration).

The memory 304 may include one or more regions of storage elements (also referred to herein as memory cells). An example of a region of storage elements is an erase group (or "block") of storage elements. A block may include a plurality of bit lines and word lines connecting the storage elements. Each storage element of the memory 304 may be programmable to a state (e.g., a threshold voltage in a flash configuration or a resistive state in a resistive memory configuration) that indicates one or more bit values. The memory 304 may include protected internal storage 306. FIG. 3 also illustrates that the memory array 303 may further include read/write circuitry 322. The read/write circuitry 322 is coupled to the memory 304.

The controller 330 may include the multi-mode security engine 134. The controller 330 may further include storage 332 and an interface 340. The multi-mode security engine 134 may include an authentication engine 342, an encryption engine 344, and a key derivation engine 346.

The interface 340 may be configured to operate in accordance with one or more interface protocols. For example, the interface 340 may be configured to operate in accordance with an NVMe interface protocol, a small computer system interface (SCSI) protocol, an advanced technology attachment (ATA) protocol, or an embedded MultiMedia Card (eMMC) protocol, as illustrative examples.

The storage 332 may include secure storage, such as a one-time programmable (OTP) memory. Alternatively or in addition, the storage 332 may include a volatile memory, such as a random access memory (RAM).

The controller 330 is configured to receive data and instructions from the accessing device 366 and to send data to the accessing device 366. For example, the controller 330 may receive data 360 from the accessing device 366 using the interface 340 in accordance with an NVMe interface protocol and may send data to the accessing device 366 using the interface 340 in accordance with an NVMe interface protocol.

The controller 330 is configured to send data and commands to the memory 304 and to receive data from the memory 304. For example, the controller 330 may be configured to send the data 360 (or an encoded representation of the data 360) and a write command to cause the memory 304 to store the data 360 to a specified address of the memory 304. The write command may specify a physical address of a portion of the memory 304 that is to store the data 360. The controller 330 is configured to send a read command to the memory 304 to access data from a specified address of the memory 304. The read command may specify the physical address of a portion of the memory 304, such as a physical address associated with the data 360.

The accessing device 366 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The accessing device 366 may communicate via a host controller, which may enable the accessing device 366 to communicate with the data storage device 302. The accessing device 366 may operate in compliance with a JEDEC Solid State Technology Association industry specification, such as an embedded MultiMedia Card (eMMC) specification. The accessing device 366 may operate in compliance with one or more other specifications, such as an NVMe specification, an ATA specification, or an SCSI specification, as illustrative examples. Alternatively, the accessing device 366 may communicate with the data storage device 302 in accordance with another communication protocol. In some implementations, the data storage device 302 may be a component (e.g., an SSD component) of a network accessible data storage system, such as an enterprise data system, a network-attached storage system, or a cloud data storage system, as illustrative examples.

During operation, the data storage device 302 may be configured to operate in accordance with one or more security protocols. A security protocol may be used by the data storage device 302 to secure data stored at the memory 304 (e.g., to inhibit or prevent malicious devices from writing data to the memory 304, reading data stored at the memory 304, and/or modifying data stored at the memory 304).

To further illustrate, the data storage device 302 may operate in accordance with a first security protocol. The first security protocol may specify that the accessing device 366 is to be authenticated prior to allowing the accessing device 366 access to the memory 304. For example, the first security protocol may be a Trusted Computing Group™ (TCG) (service mark of Trusted Computing Group non-profit corporation of Beaverton, Oreg.) security protocol, such as a TCG Pyrite security protocol. In some implementations, the first security protocol does not specify that the data 360 is to be encrypted. To further illustrate, the first security protocol may be a password-based security protocol or an authentication-based security protocol that specifies that data stored at the memory 304 is to be unencrypted (e.g., using a "plaintext" format or using a "cleartext" format).

To illustrate, the data storage device 302 may be configured to receive a message 362 from the accessing device 366. In response to receiving the message 362, the controller 330 may initiate an authentication process to authenticate the accessing device 366. For example, the message 362 may include a representation of a password (e.g., a hash value of a password, as an illustrative example) associated with the first security protocol. The controller 330 may input the message 362 to the authentication engine 342 to authenticate the accessing device 366 in accordance with the first security protocol. If the authentication engine 342 fails to authenticate the accessing device 366, the controller 330 may send a message (e.g., an error message) indicating that the authentication process is unsuccessful.

If the authentication engine 342 authenticates the accessing device 366, the controller 330 may perform operations in response to commands received from the accessing device 366, such as by writing data to the memory 304, reading data from the memory 304, or discarding data from the memory 304. For example, after authenticating the accessing device 366, the controller 330 may receive the data 360 in connection with a request for write access to the memory 304 from the accessing device 366.

While operating according to the first security protocol, the controller 330 may encrypt data to be stored at the memory 304 in accordance with a second security protocol. For example, the second security protocol may be a TCG security protocol, such as a TCG Opal security protocol. The second security protocol may be an encryption-based protocol that specifies that data (e.g., the data 360) is to be encrypted.

The controller 330 may encrypt the data 360 while operating according to the first security protocol using a first key 334 (e.g., a user data key) associated with the second security protocol. The first key 334 may be encrypted and decrypted using a second key 336 (e.g., a system key). To illustrate, the controller 330 may generate the second key 336 by inputting a root key 338 to the key derivation engine 346. For example, the root key 338 may be "hard coded" into the controller 330, and the controller 330 may use the root key 338 to generate the second key 336 in response to an initial power-up of the data storage device 302. In an illustrative implementation, the key derivation engine 346 includes a random number generator (RNG) or a pseudo-random number generator (PRNG) configured to generate one or more keys, such as one or more of the first key 334 or the second key 336. In a particular example, the storage 332 includes an OTP memory, and one or more of the root key 338 or the second key 336 are programmed to the OTP memory.

After generating the second key 336, the controller 330 may use the second key 336 to encrypt the first key 334 to generate an encrypted key 308, which may be stored in the protected internal storage 306. After storing the encrypted key 308 in the protected internal storage 306, the controller 330 may discard the first key 334 (e.g., by deleting the first key 334 from volatile memory of the storage 332).

The controller 330 may retrieve the encrypted key 308 from the memory 304, such as upon power-up or in response to a request for read access to the encrypted data 310 from the accessing device 366. To retrieve the encrypted key 308, the controller 330 may read the encrypted key 308 from the protected internal storage 306 to generate a representation 324 of the encrypted key 308. The controller 330 may decrypt the representation 324 of the encrypted key 308 using the second key 336 to generate the first key 334.

After decrypting the encrypted key 308 to generate the first key 334, the controller 330 may use the first key 334 to encrypt and decrypt data (e.g., to encrypt and decrypt the data 360). For example, the controller 330 may input the data 360 to the encryption engine 344 to generate encrypted data based on the data 360. The controller 330 may send the encrypted data to the memory array 303 to be stored at the memory 304. For example, the encrypted data may include encrypted data 310. As another example, the controller 330 may receive a request for read access to the encrypted data 310 from the accessing device 366. In response to the request for read access, the controller 330 may send a command to the memory array 303 to sense the encrypted data 310 to generate a representation 326 of the encrypted data 310, which the controller 330 may decrypt using the first key 334.

The second security protocol may specify that encrypted data (e.g., the encrypted data 310) is to be associated with a particular locking range (e.g., a group of encrypted data that is associated with a common key, such as the first key 334). To illustrate, the memory 304 may store a multi-mode security identifier 312 that is used by the controller 330 during operation according to the first security protocol and also during operation according to the second security protocol. The multi-mode security identifier 312 may indicate a "global locking range" 314 of encrypted data (e.g., the encrypted data 310) stored at the memory 304. Data within the global locking range 314 may be encrypted using a common key (e.g., the first key 334) during operation according to the first security protocol. In a particular implementation, all data stored at the memory 304 during operation according to the first security protocol is encrypted in accordance with the global locking range 314 (e.g., the data may be encrypted and decrypted using a common key).

During operation according to the first security protocol, the data storage device 302 may send one or more messages to the accessing device 366 indicating use of one locking range (e.g., the global locking range 314) and further indicating use of password authentication (e.g., by requesting that the accessing device 366 initiate an authentication process using the message 362, or by indicating to the accessing device 366 that an authentication process has succeeded or failed). During operation according to the first security protocol, the data storage device 302 may report no encryption key to the accessing device 366 (e.g., by reporting that no encryption key is used to encrypt the data 360, or by avoiding sending a message that indicates that the data 360 is encrypted using the first key 334).

In some circumstances, the controller 330 may receive a request 364 to operate according to the second security protocol. For example, the request 364 may be sent to the controller 330 to instruct the controller 330 to encrypt data stored at the memory 304 in accordance with the second security protocol. In response to the request 364, the data storage device 302 may transition from operating according to the first security protocol to operating according to the second security protocol. Depending on the particular implementation, the data storage device 302 may terminate activities associated with the first security protocol after receiving the request 364 (e.g., by ceasing to authenticate the accessing device 366), or the data storage device 302 may continue to perform one or more operations associated with the first security protocol (e.g., an authentication process associated with the first security protocol).

In response to transitioning from operating according to the first security protocol to operating according to the second security protocol, the controller 330 may update the multi-mode security identifier 312 to indicate the accessing device 366 has been notified (or is to be notified) of the use of encryption. The controller 330 may report use of the second security protocol to the accessing device 366 (e.g., the controller 330 may report that data is encrypted in accordance with the second security protocol). For example, the controller 330 may report use of the second security protocol using one or more TCG messages, such as a response 368. The response 368 may include one or more of an IDENTIFY descriptor or a TCG descriptor associated with a TCG Opal security protocol, as illustrative examples. In a particular implementation, the controller 330 does not report use of encryption to the accessing device 366 while operating according to the first security protocol (e.g., the controller 330 may "hide" use of encryption from the accessing device 366 while operating according to the second security protocol). In this example, use of encryption during operation according to the first security protocol is transparent to the accessing device 366.

During operation according to the second security protocol, the controller 330 may receive one or more commands from the accessing device 366 to "open" one or more locking ranges (in addition to the global locking range 314). To illustrate, the controller 330 may generate second mode security identifiers 316 associated with the second security protocol in response to receiving one or more commands from the accessing device 366 to "open" one or more locking ranges. FIG. 1 illustrates that a first locking range 318 may be associated with a first group of encrypted data that is encrypted using a common key and that an nth locking range 320 may be associated with an nth group of encrypted data that is encrypted using another common key (where n is a positive integer greater than two). The keys associated with the first locking range 318 and the nth locking range 320 may correspond to one or more additional keys 309 stored at the protected internal storage 306. The one or more additional keys 309 may be generated or regenerated by the controller 330 during operation according to the second security protocol in response to one or more commands received from the accessing device 366 (e.g., in response to receiving one or more commands from the accessing device 366 to "open" one or more locking ranges).

Encrypting data while operating according to the first security protocol may enable the controller 330 to transition from operating according to the first security protocol to operating according to the second security protocol without reformatting the memory 304. For example, because the data 360 is encrypted (and stored as the encrypted data 310) in accordance with the second security protocol before the request 364 is received from the accessing device 366, data loss associated with reformatting the memory 304 can be avoided (because the data 360 is already encrypted when the request 364 is received).

Figure 4:
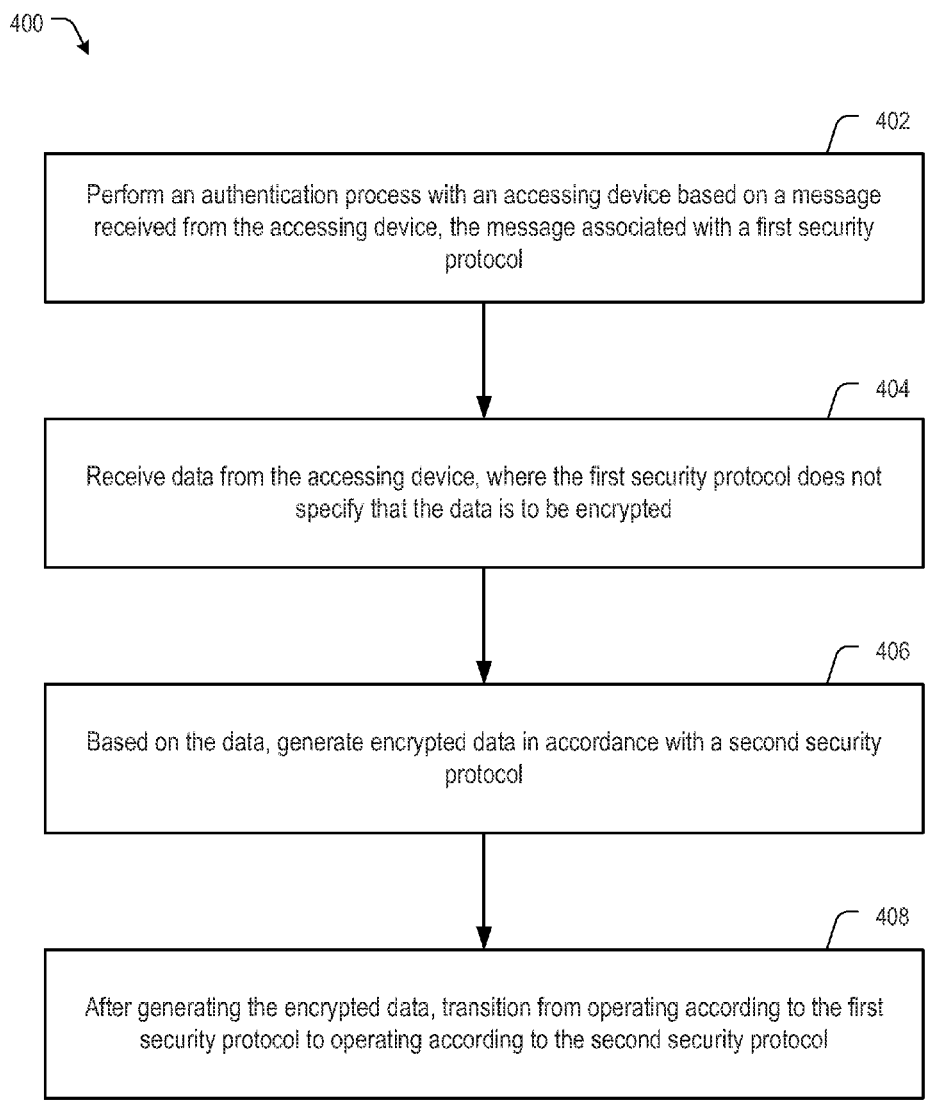
FIG. 4 is a flow diagram of an illustrative example of a method of operation of a data storage device.

Referring to FIG. 4, an illustrative example of a method is depicted and generally designated 400. The method 400 may be performed at a data storage device (e.g., the data storage device 302) that includes a memory (e.g., the memory 304). For example, the method 400 may be performed by the controller 330.

The method 400 includes performing an authentication process with an accessing device based on a message received from the accessing device, the message associated with a first security protocol, at 402. For example, the accessing device may correspond to the accessing device 366, and the message may correspond to the message 362. To further illustrate, the message 362 may indicate representation of a password (e.g., a hash value associated with a password) that is compliant with the first security protocol.

The method 400 further includes receiving data from the accessing device, at 404. For example, the data may correspond to the data 360. The first security protocol does not specify that the data is to be encrypted. For example, the first security protocol may specify that a password-based authentication process is to be performed instead of encrypting data. In a particular implementation, the data storage device 302 is embedded within the accessing device 366, and the data 360 is received from the accessing device 366 in accordance with an NVMe interface protocol.

The method 400 further includes generating encrypted data in accordance with a second security protocol based on the data, at 406. For example, the encrypted data may correspond to the encrypted data 310. In an illustrative implementation, the controller 330 inputs the data 360 to the encryption engine 344 to generate the encrypted data 310. The encryption engine 344 may encrypt the data 360 using a first key (e.g., the first key 334) to generate the encrypted data 310, and the method 400 may optionally include storing the encrypted data 310 at the memory 304. The second security protocol may be an encryption-based security protocol that specifies that data is to be encrypted. The first key 334 may be independent of the password indicated by the message 362 (or independent of a representation of the password indicated by the message 362).

The method 400 further includes transitioning from operating according to the first security protocol to operating according to the second security protocol after generating the encrypted data, at 408. For example, the method 400 may optionally include receiving the request 364 from the accessing device 366 to operate according to the second security protocol. In this example, the encrypted data 310 may be stored at the memory 304 before the request 364 is received from the accessing device 366. Transitioning from operating according to the first security protocol to operating according to the second security protocol may be performed in response to receiving the request 364 and without reformatting of the memory 304.

The method 400 may optionally include sensing a representation of the encrypted data from the memory and decrypting the representation of the encrypted data using the first key. For example, the representation 324 of the encrypted data 310 may be sensed from the memory 304 and may be decrypted using the first key 334, such as in response to receiving a request for read access from the accessing device 366. The representation 326 of the encrypted data 310 may be sensed during operation according to the first security protocol, during operation according to the second security protocol, or both.

The method 400 may optionally include reporting use of the second security protocol to the accessing device in response to transitioning from operating according to the first security reporting use of the second security protocol. For example, the controller 330 may send the response 368 to the accessing device 366 while operating according to the second security protocol. The response 368 may include a TCG message, which may include one or more of an IDENTIFY descriptor or a TCG descriptor, as illustrative examples.

The method 400 may optionally include encrypting the first key to generate an encrypted key and storing the encrypted key at the memory. For example, the encrypted key 308 may be stored at the protected internal storage 306 of the memory 304. Alternatively or in addition, the method 400 may optionally include generating one or more additional keys to encrypt the data in response to one or more commands received from the accessing device (e.g., to "open" one or more additional locking ranges, such as the locking ranges 318, 320). For example, the one or more additional keys may correspond to the one or more additional keys 309.

Use of the method 400 of FIG. 4 may enable a controller to transition from operating according to the first security protocol to operating according to the second security protocol without reformatting a memory. For example, because the data 360 is encrypted (and stored as the encrypted data 310) in accordance with the second security protocol before the request 364 is received from the accessing device 366, data loss associated with reformatting the memory 304 can be avoided (because the data 360 is already encrypted when the request 364 is received).

Figure 5:
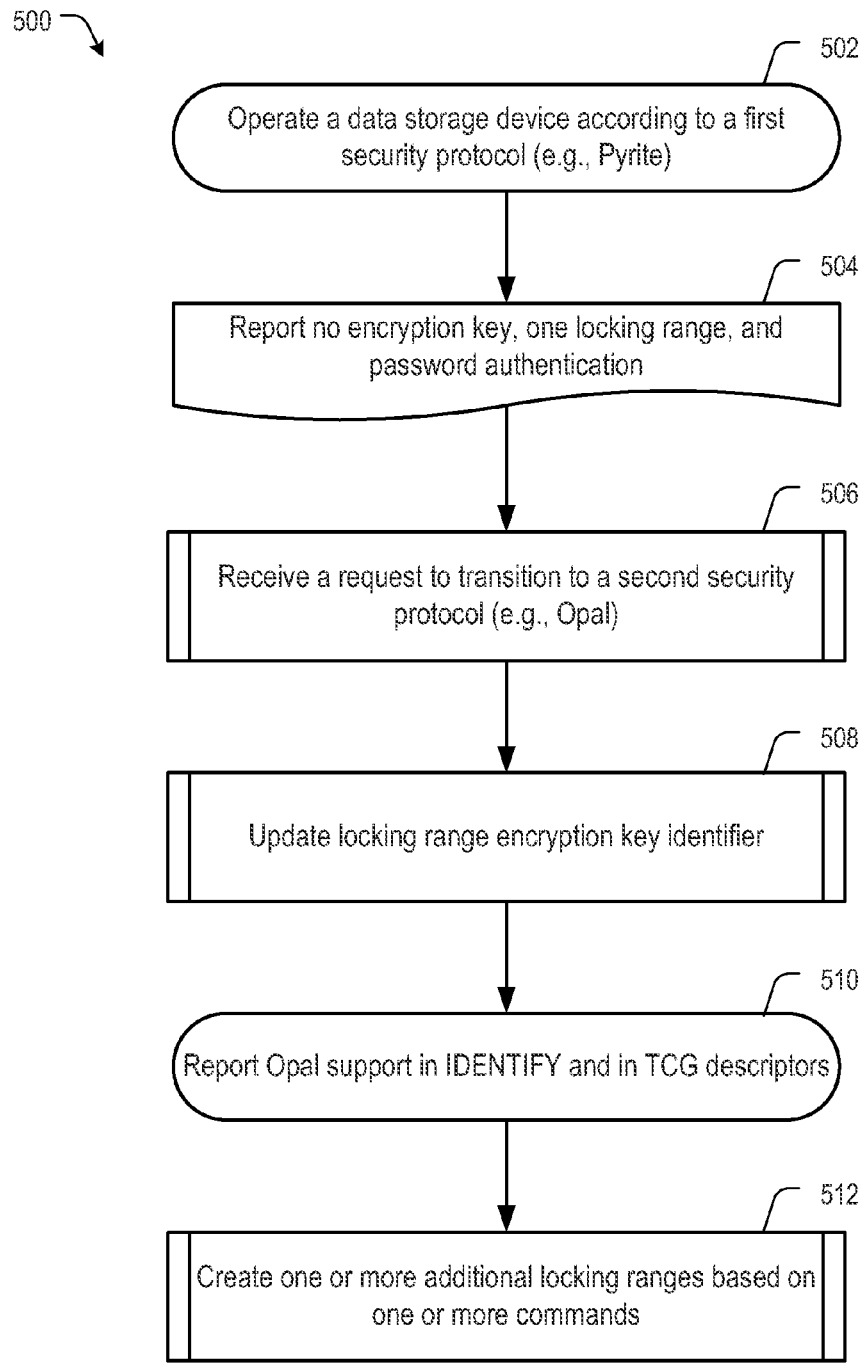
FIG. 5 is a flow diagram of another illustrative example of a method of operation of a data storage device.

Referring to FIG. 5, another illustrative example of a method is depicted and generally designated 500. The method 500 may be performed at a data storage device (e.g., the data storage device 302) that includes a memory (e.g., the memory 304) and that is responsive to an accessing device (e.g., the accessing device 366). The method 500 may be performed by the controller 330.

The method 500 includes operating the data storage device according to a first security protocol, at 502. For example, the first security protocol may be a TCG security protocol, such as a TCG Pyrite security protocol.

The method 500 further includes reporting one locking range and password authentication, at 504. To illustrate, the data storage device 302 may send one or more messages to the accessing device 366 indicating that one locking range (e.g., the global locking range 314) and further indicating password authentication (e.g., by requesting that the accessing device 366 initiate an authentication process using the message 362, or by indicating to the accessing device 366 that an authentication process has succeeded or failed). During operation according to the first security protocol, the data storage device 302 may report no encryption key to the accessing device 366 (e.g., by reporting that no encryption key is used to encrypt the data 360, or by avoiding sending a message that indicates that the data 360 is encrypted using the first key 334).

The method 500 further includes receiving a request to transition to a second security protocol, at 506. To illustrate, the request may correspond to the request 364, and the second security protocol may be a TCG security protocol, such as a TCG Opal security protocol.

The method 500 further includes updating a locking range encryption key identifier, at 508. For example, the controller 330 may update the multi-mode security identifier 312 to indicate the accessing device 366 has been notified (or is to be notified) of the use of encryption.

The method 500 further includes reporting TCG Opal security protocol support to the accessing device, at 510. For example, the controller 330 may send the response 368 to the accessing device 366, and the response 368 may indicate use of a TCG Opal security protocol. The response 368 may include one or more of an IDENTIFY descriptor or a TCG descriptor, as an illustrative example.

The method 500 further includes creating one or more additional locking ranges based on one or more commands, at 512. For example, the controller 330 may receive one or more commands from the accessing device 366 to "open" one or more additional locking ranges, such as the first locking range 318 and the nth locking range 320.

The method 500 of FIG. 5 may enable a controller to transition from operating according to a TCG Pyrite security protocol to operating according to a TCG Opal security protocol without reformatting a memory. Accordingly, data loss associated with reformatting of a memory can be avoided.

Figure 6:
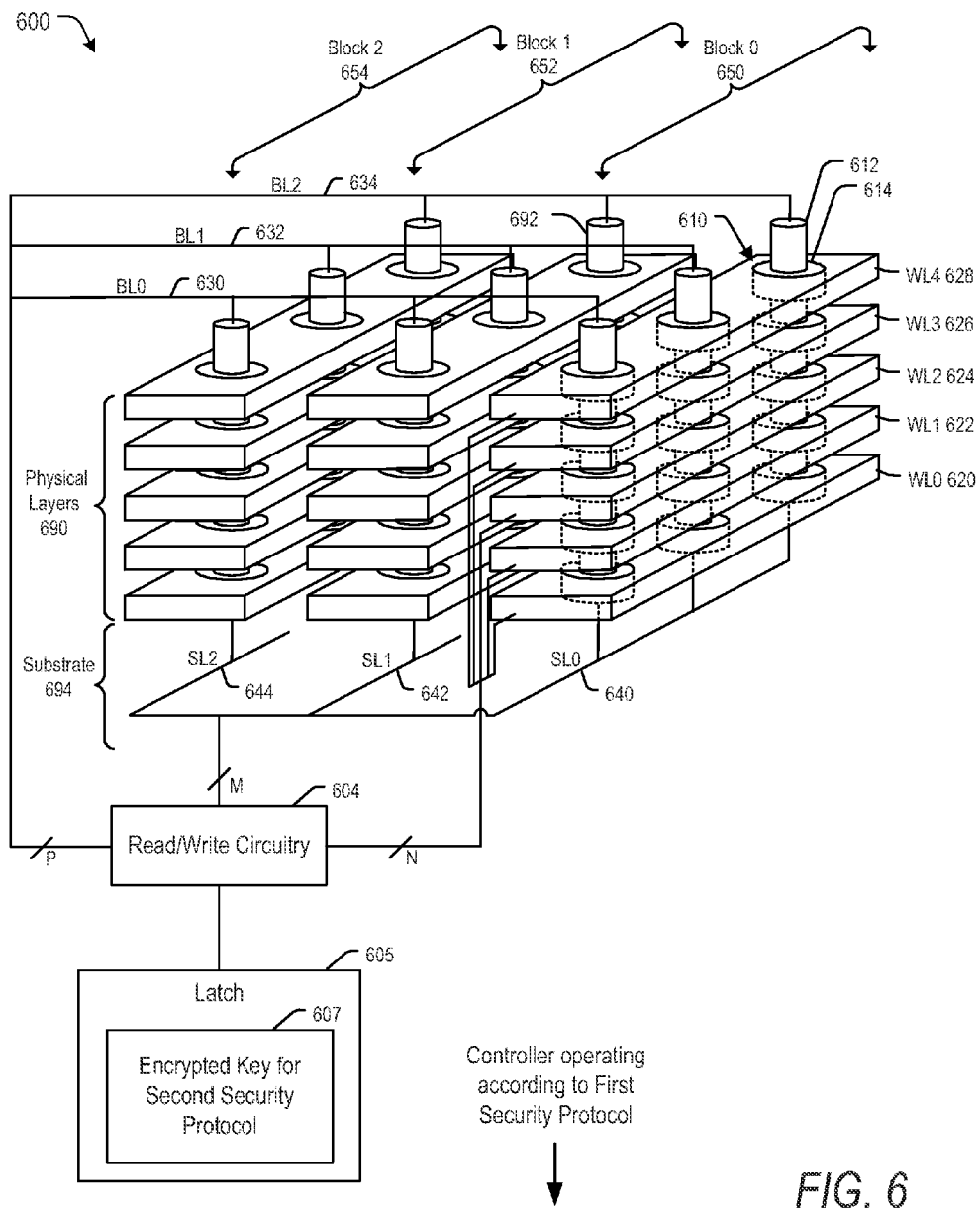
FIG. 6 is a diagram of an illustrative example of a portion of a memory die that may be included in a data storage device.
Figure 7:
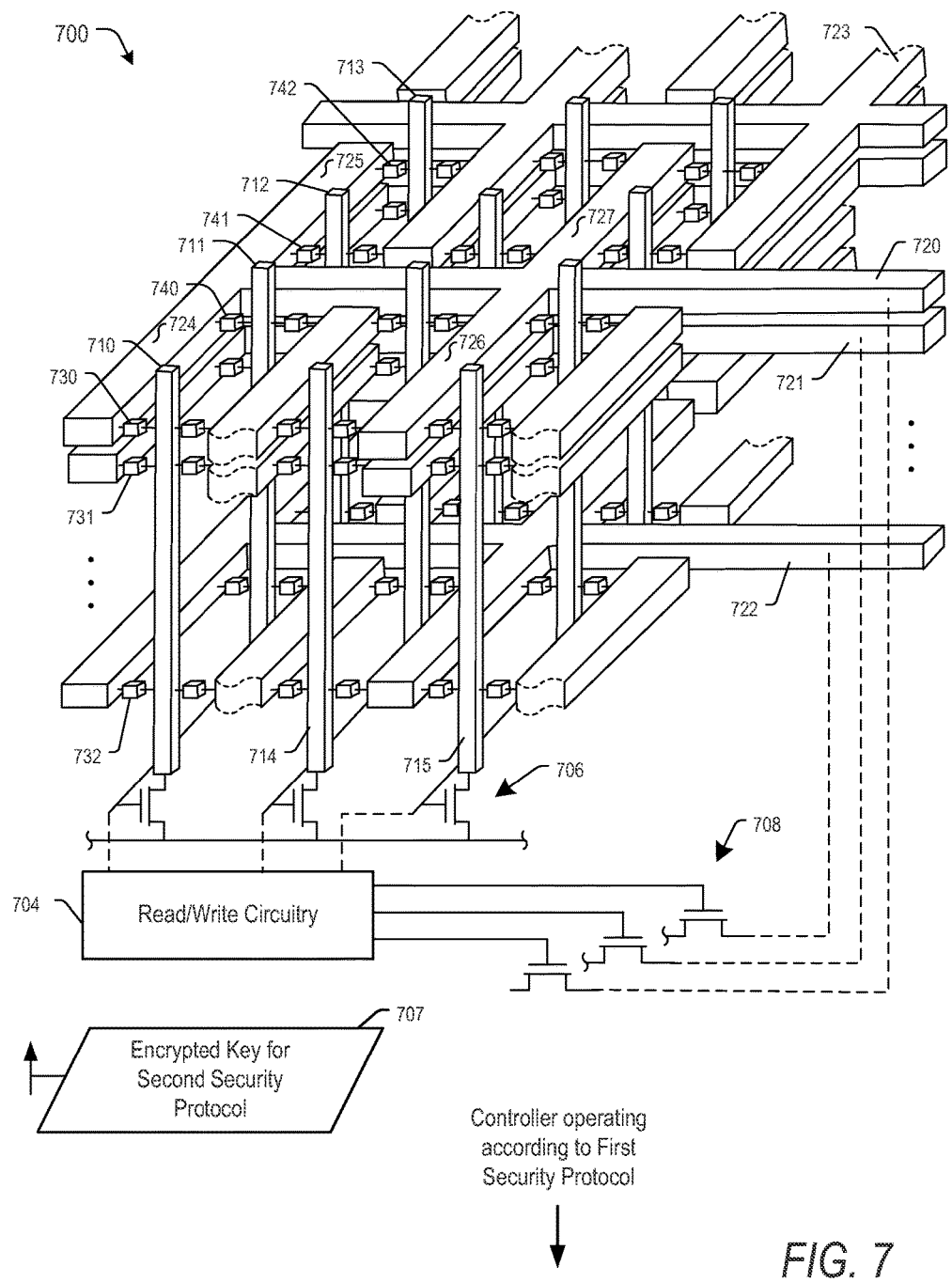
FIG. 7 is a diagram of another illustrative example of a portion of a memory die that may be included in a data storage device.

FIGS. 6 and 7 describe illustrative implementations of memory dies having monolithic 3D memory configurations. It should be appreciated that the examples of the disclosure are also applicable to other memory configurations, such as a 2D memory configuration or a non-monolithic 3D memory configuration (e.g., a stacked die 3D memory configuration).

FIG. 6 illustrates a portion of a memory die 600 having a NAND flash configuration. The memory die 600 may be included in the data storage device 302. For example, the memory die 600 may correspond to the memory array 303 of FIG. 3. The memory die 600 may be coupled to the controller 330.

The memory die 600 may include read/write circuitry 604 and one or more latches (e.g., a latch 605). The read/write circuitry 604 may correspond to the read/write circuitry 322 of FIG. 3.

The memory die 600 includes multiple physical layers, such as a group of physical layers 690. The multiple physical layers are monolithically formed above a substrate 694, such as a silicon substrate. Storage elements (e.g., memory cells), such as a representative memory cell 610, are arranged in arrays in the physical layers.

The representative memory cell 610 includes a charge trap structure 614 between a word line/control gate (WL4) 628 and a conductive channel 612. Charge may be injected into or drained from the charge trap structure 614 via biasing of the conductive channel 612 relative to the word line 628. For example, the charge trap structure 614 may include silicon nitride and may be separated from the word line 628 and the conductive channel 612 by a gate dielectric, such as silicon oxide. An amount of charge in the charge trap structure 614 affects an amount of current through the conductive channel 612 during a read operation of the memory cell 610 and indicates one or more bit values that are stored in the memory cell 610.

The memory die 600 includes multiple erase blocks, including a first block (block 0) 650, a second block (block 1) 652, and a third block (block 2) 654. Each block 650-654 includes a "vertical slice" of the physical layers 690 that includes a stack of word lines, illustrated as a first word line (WL0) 620, a second word line (WL1) 622, a third word line (WL2) 624, a fourth word line (WL3) 626, and a fifth word line (WL4) 628. Multiple conductive channels (having a substantially vertical orientation with respect to FIG. 6) extend through the stack of word lines. Each conductive channel is coupled to a storage element in each word line 620-628, forming a NAND string of storage elements. FIG. 6 illustrates three blocks 650-654, five word lines 620-628 in each block, and three conductive channels in each block for clarity of illustration. However, the memory die 600 may have more than three blocks, more than five word lines per block, and more than three conductive channels per block.

The read/write circuitry 604 is coupled to the conductive channels via multiple conductive lines, illustrated as a first bit line (BL0) 630, a second bit line (BL1) 632, and a third bit line (BL2) 634 at a "top" end of the conducive channels (e.g., farther from the substrate 694). The read/write circuitry 604 is also coupled to the conductive channels via multiple source lines, such as via a first source line (SL0) 640, a second source line (SL1) 642, and a third source line (SL2) 644 at a "bottom" end of the conductive channels (e.g., nearer to or within the substrate 694). The read/write circuitry 604 is illustrated as coupled to the bit lines 630-634 via "P" control lines, coupled to the source lines 640-644 via "M" control lines, and coupled to the word lines 620-628 via "N" control lines. Each of P, M, and N may have a positive integer value based on the specific configuration of the memory die 600. In the illustrative example of FIG. 6, P=3, M=3, and N=5.

In a particular embodiment, each of the bit lines and each of the source lines may be coupled to the same end (e.g., the top end or the bottom end) of different conductive channels. For example, a particular bit line may be coupled to the top of a conductive channel 692 and a particular source line may be coupled to the top of the conductive channel 612. The bottom of the conductive channel 692 may be coupled (e.g., electrically coupled) to the bottom of the conductive channel 612. Accordingly, the conductive channel 692 and the conductive channel 612 may be coupled in series and may be coupled to the particular bit line and the particular source line.

During a write operation, the controller 330 may receive a request from the accessing device 366. The request may include data (e.g., the data 360) to be written at storage elements of the memory die 600. The controller 330 may send a command to the memory die 600 to cause the memory die 600 to initiate the write operation. For example, the controller 330 may send a write opcode and a physical address to the read/write circuitry 604 and data to the latch 605.

The read/write circuitry 604 may be configured to access the data in the latch 605 and to program the data to storage elements of the memory die 600 based on one or more write parameters indicated by the particular command. For example, the read/write circuitry 604 may be configured to apply selection signals to control lines coupled to the word lines 620-628, the bit lines 630-634, and the source lines 640-642 to cause a programming voltage (e.g., a voltage pulse or series of voltage pulses) to be applied across one or more selected storage elements of the selected word line (e.g., the fourth word line 628, as an illustrative example).

During a read operation, the controller 330 may receive a request from the accessing device 366. The controller 330 may cause the read/write circuitry 604 to read bits from particular storage elements of the memory die 600 by applying appropriate signals to the control lines to cause storage elements of a selected word line to be sensed. Accordingly, the memory die 600 may be configured to store and access data.

FIG. 6 also illustrates that the memory die 600 may receive an encrypted key 607 (e.g., the encrypted key 308) to be stored at the memory die 600. For example, the memory die 600 may include the protected internal storage 306 of FIG. 3. The encrypted key 607 may be stored at the protected internal storage 306. For example, the protected internal storage 306 may include an OTP memory, and the read/write circuitry 604 may be configured to program the encrypted key 607 to the OTP memory. The encrypted key 607 may be associated with a second security protocol (e.g., a TCG Opal security protocol), and the controller 330 may send the encrypted key 607 to the memory die 600 while the controller 330 is operating according to a first security protocol (e.g., a TCG Pyrite security protocol).

FIG. 7 illustrates a portion of a memory die 700 having a ReRAM configuration. The memory die 700 may be included in the data storage device 302. For example, the memory die 700 may correspond to the memory array 303 of FIG. 3. The memory die 700 may be coupled to the controller 330.

The memory die 700 may include read/write circuitry 704. The read/write circuitry 704 may correspond to the read/write circuitry 322 of FIG. 3.

In the example of FIG. 7, the memory die 700 includes a vertical bit line (VBL) ReRAM with a plurality of conductive lines in physical layers over a substrate (e.g., substantially parallel to a surface of the substrate), such as representative word lines 720, 721, 722, and 723 (only a portion of which is shown in FIG. 7) and a plurality of vertical conductive lines through the physical layers, such as representative bit lines 710, 711, 712, and 713. The word line 722 may include or correspond to a first group of physical layers of the memory die 700, and the word lines 720, 721 may include or correspond to a second group of physical layers of the memory die 700.

The memory die 700 also includes a plurality of resistance-based storage elements (e.g., memory cells), such as representative storage elements 730, 731, 732, 740, 741, and 742. Each of the storage elements 730, 731, 732, 740, 741, and 742 is coupled to (or is associated with) a bit line and a word line in arrays of memory cells in multiple physical layers over the substrate (e.g., a silicon substrate).

In the example of FIG. 7, each word line includes a plurality of fingers. To illustrate, the word line 720 includes fingers 724, 725, 726, and 727. Each finger may be coupled to more than one bit line. For example, the finger 724 of the word line 720 is coupled to the bit line 710 via the storage element 730 at a first end of the finger 724, and the finger 724 is further coupled to the bit line 711 via the storage element 740 at a second end of the finger 724.

In the example of FIG. 7, each bit line may be coupled to more than one word line. To illustrate, the bit line 710 is coupled to the word line 720 via the storage element 730, and the bit line 710 is further coupled to the word line 722 via the storage element 732.

During a write operation, the controller 330 may receive data (e.g., the data 360) from the accessing device 366. The controller 330 may send a command to the memory die 700 to cause the memory die 700 to initiate a write operation.

The read/write circuitry 704 may be configured to program the data to storage elements corresponding to the destination of the data. For example, the read/write circuitry 704 may apply selection signals to selection control lines coupled to the word line drivers 708 and the bit line drivers 706 to cause a write voltage to be applied across a selected storage element. As an illustrative example, to select the storage element 730, the read/write circuitry 704 may activate the word line drivers 708 and the bit line drivers 706 to drive a programming current (also referred to as a write current) through the storage element 730. To illustrate, a first write current may be used to write a first logical value (e.g., a value corresponding to a high-resistance state) to the storage element 730, and a second write current may be used to write a second logical value (e.g., a value corresponding to a low-resistance state) to the storage element 730. The programming current may be applied by generating a programming voltage across the storage element 730 by applying a first voltage to the bit line 710 and to word lines other than the word line 720 and by applying a second voltage to the word line 720. In a particular embodiment, the first voltage is applied to other bit lines (e.g., the bit lines 714, 715) to reduce leakage current in the memory die 700.

During a read operation, the controller 330 may receive a request from a host device, such as the accessing device 366. The controller 330 may issue a command to the memory die 700 specifying one or more physical addresses of the memory die 700.

The memory die 700 may cause the read/write circuitry 704 to read bits from particular storage elements of the memory die 700, such as by applying selection signals to selection control lines coupled to the word line drivers 708 and the bit line drivers 706 to cause a read voltage to be applied across a selected storage element. For example, to select the storage element 730, the read/write circuitry 704 may activate the word line drivers 708 and the bit line drivers 706 to apply a first voltage (e.g., approximately 0.7 volts (V), or another voltage) to the bit line 710 and to word lines other than the word line 720. A lower voltage (e.g., 0 V) may be applied to the word line 720. Thus, a read voltage is applied across the storage element 730, and a read current corresponding to the read voltage may be detected at a sense amplifier of the read/write circuitry 704. The read current corresponds (via Ohm's law) to a resistance state of the storage element 730, which corresponds to a logic value stored at the storage element 730. The logic value read from the storage element 730 and other elements read during the read operation may be provided to the controller 330.

FIG. 7 also illustrates that the memory die 700 may receive an encrypted key 707 (e.g., the encrypted key 308) to be stored at the memory die 700. For example, the memory die 700 may include the protected internal storage 306 of FIG. 3. The encrypted key 707 may be stored at the protected internal storage 306. For example, the protected internal storage 306 may include an OTP memory, and the read/write circuitry 704 may be configured to program the encrypted key 707 to the OTP memory. The encrypted key 707 may be associated with a second security protocol (e.g., a TCG Opal security protocol), and the controller 330 may send the encrypted key 707 to the memory die 700 while the controller 330 is operating according to a first security protocol (e.g., a TCG Pyrite security protocol).

Although the multi-mode security engine 134, the authentication engine 342, the encryption engine 344, the key derivation engine 346, and certain other components described herein are illustrated as block components and described in general terms, such components may include one or more microprocessors, state machines, and/or other circuits configured to enable the data storage device 302 (or one or more components thereof) to perform operations described herein. Components described herein may be operationally coupled to one another using one or more nodes, one or more buses (e.g., data buses and/or control buses), one or more other structures, or a combination thereof. One or more components described herein may include one or more physical components, such as hardware controllers, state machines, logic circuits, one or more other structures, or a combination thereof, to enable the data storage device 302 to perform one or more operations described herein.

Alternatively or in addition, one or more aspects of the data storage device 302 may be implemented using a microprocessor or microcontroller programmed (e.g., by executing instructions) to perform operations described herein, such as one or more operations of the method 400 of FIG. 4, the method 500 of FIG. 5, or a combination thereof. One or more operations described herein may be implemented using a processor that executes instructions. In a particular embodiment, the data storage device 302 includes a processor executing instructions (e.g., firmware) retrieved from the memory 304. Alternatively or in addition, instructions that are executed by the processor may be retrieved from a separate memory location that is not part of the memory 304, such as at a read-only memory (ROM) or at a one-time programmable (OTP), either of which may be included in the storage 332, as an illustrative example.

The data storage device 302 may be attached to or embedded within one or more host devices, such as within a housing of a host communication device (e.g., the accessing device 366). For example, the data storage device 302 may be integrated within an apparatus such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory. However, in other embodiments, the data storage device 302 may be implemented in a portable device configured to be selectively coupled to one or more external devices, such as the accessing device 366.

To further illustrate, the data storage device 302 may be configured to be coupled to the accessing device 366 as embedded memory, such as in connection with an embedded MultiMedia Card (eMMC®) (trademark of JEDEC Solid State Technology Association, Arlington, Va.) configuration, as an illustrative example. The data storage device 302 may correspond to an eMMC device. As another example, the data storage device 302 may correspond to a memory card. The data storage device 302 may operate in compliance with a JEDEC industry specification. For example, the data storage device 302 may operate in compliance with a JEDEC eMMC specification.

The memory 304 may include a three-dimensional (3D) memory, such as a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. In a particular embodiment, the data storage device 302 is indirectly coupled to an accessing device (e.g., the accessing device 366) via a network. For example, the data storage device 302 may be a network-attached storage (NAS) device or a component (e.g., a solid-state drive (SSD) component) of a data center storage system, an enterprise storage system, or a storage area network. Alternatively or in addition, the memory 304 may include another type of memory. The memory 304 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device comprising:
   a memory; and
   a controller coupled to the memory, wherein the controller includes:
   an authentication engine configured to authenticate an accessing device based on a message received from the accessing device, the message associated with a first security protocol;
   an interface configured to receive data from the accessing device, wherein the first security protocol specifies that the data is not to be encrypted; and
   an encryption engine configured to encrypt the data in accordance with a second security protocol with a first key in response to receiving the message associated with the first security protocol, wherein the second security protocol uses a global locking range of encrypted data and wherein the controller is configured to receive, after encrypting the data, a request from the accessing device to operate according to the second security protocol, and wherein the encrypted data is stored at the memory before the request is received from the accessing device and wherein the controller has a hard coded root key that is used to generate a second key used to encrypt the first key to create an encrypted key, wherein encrypting the data while operating according to the first security protocol enables the controller to transition from operating according to the first security protocol to operating according to the second security protocol without reformatting the memory and wherein the first key corresponds to a user data key, and wherein the second key corresponds to a system key.

2. The data storage device of claim 1, wherein the controller further includes a key derivation engine configured to generate, during operation according to the first security protocol, the second key based on the root key stored at the data storage device.

3. The data storage device of claim 1, wherein the first security protocol is a Trusted Computing Group (TCG) Pyrite security protocol, and wherein the second security protocol is a TCG Opal security protocol.

4. The data storage device of claim 1, wherein the data storage device is embedded within the accessing device, and wherein the interface is further configured to receive the data from the accessing device in accordance with a non-volatile memory express (NVMe) interface protocol.

5. The data storage device of claim 1, wherein the message indicates a representation of a password associated with the first security protocol.

6. The data storage device of claim 1, wherein the memory includes a memory die having a three-dimensional (3D) memory configuration that is monolithically formed in one or more physical levels of arrays of memory cells having an active area above a silicon substrate, and further comprising circuitry associated with operation of the memory cells.

7. A method comprising:
in a data storage device that includes a controller and a memory, performing by the controller:
retrieving a hard coded root key in the controller;
generating a second key from the hard coded root key in a key derivation engine within a multi-mode security engine that further has a separate authentication engine and encryption engine;
creating an encrypted key from a first key based upon the second key;
performing an authentication process with an accessing device based on a message received from the accessing device, the message associated with a first security protocol;
receiving data from the accessing device, wherein the first security protocol specifies that the data is not to be encrypted;
based on the data, generating encrypted data in accordance with a second security protocol in response to receiving the message associated with the first security protocol;
receiving a request from the accessing device to operate according to the second security protocol, wherein the second security protocol uses a global locking range of encrypted data and wherein the encrypted data is stored at the memory before the request is received from the accessing device; and
after generating the encrypted data, transitioning from operating according to the first security protocol to operating according to the second security protocol.

8. The method of claim 7, wherein generating the encrypted data includes encrypting the data using a first key to generate the encrypted data, and further comprising storing the encrypted data at the memory.

9. The method of claim 7, wherein transitioning from operating according to the first security protocol to operating according to the second security protocol is performed in response to receiving the request and without reformatting of the memory.

10. The method of claim 8, further comprising:
sensing a representation of the encrypted data from the memory; and
decrypting the representation of the encrypted data using the first key.

11. The method of claim 7, wherein generating the encrypted data is transparent to the accessing device during operation based on the first security protocol.

12. The method of claim 7, further comprising reporting use of the second security protocol to the accessing device in response to transitioning from operating according to the first security protocol to operating according to the second security protocol.

13. The method of claim 12, wherein reporting use of the second security protocol includes sending one or more Trusted Computing Group (TCG) messages to the accessing device.

14. The method of claim 13, wherein the one or more TCG messages include a response that includes one or more of an IDENTIFY descriptor or a TCG descriptor.

15. The method of claim 7, wherein the second security protocol specifies that the data is to be encrypted.

16. The method of claim 7, wherein the data storage device is embedded within the accessing device, and wherein the data is received from the accessing device in accordance with a non-volatile memory express (NVMe) interface protocol.

17. The method of claim 7, wherein the message indicates a representation of a password that is compliant with the first security protocol.

18. The method of claim 17, wherein a first key used to generate the encrypted data is independent of the password.

19. The method of claim 18, further comprising:
encrypting the first key to generate an encrypted key; and
storing the encrypted key at the memory.

20. The method of claim 19, wherein the encrypted key is stored at protected internal storage of the memory.

21. The method of claim 7, further comprising generating one or more additional keys to encrypt the data in response to one or more commands received from the accessing device.

22. The method of claim 7, wherein the memory has a three-dimensional (3D) memory configuration that is monolithically formed in one or more physical levels of arrays of memory cells having an active area above a silicon substrate.

23. A device comprising:
a memory; and
a controller coupled to the memory, wherein the controller includes:
a multi-mode security engine configured to perform an authentication process with an accessing device based on a message received from the accessing device, the message associated with a first security protocol; and
an interface configured to receive data from the accessing device, wherein the first security protocol specifies that the data is not to be encrypted, wherein the multi-mode security engine is further configured to generate encrypted data based on the data in accordance with a second security protocol with a first key in response to receiving the message associated with the first security protocol and wherein the second security protocol uses a global locking range of encrypted data, wherein the multi-mode security engine is further configured to receive a request from the accessing device to operate according to the second security protocol, wherein the multi-mode security engine is further configured to store the encrypted data at the memory before the request is received from the accessing device, and wherein the controller is further configured to transition from operating according to the first security protocol to operating according to the second security protocol after generating the encrypted data and wherein the controller has a hard coded root key that is used to generate a second key that is used to encrypt and decrypt the first key to create an encrypted key.

24. The device of claim 23, wherein the memory has a three-dimensional (3D) memory configuration that is monolithically formed in one or more physical levels of arrays of memory cells having an active area above a silicon substrate, and further comprising circuitry associated with operation of the memory cells.

* * * * *